United States Patent [19]

Dismukes et al.

[11] Patent Number: 4,931,068

[45] Date of Patent: Jun. 5, 1990

[54] METHOD FOR FABRICATING FRACTURE-RESISTANT DIAMOND AND DIAMOND COMPOSITE ARTICLES

[75] Inventors: John P. Dismukes, Annandale; Michael J. Luton, Summit; Joseph Vallone, Roselle, all of N.J.

[73] Assignee: Exxon Research and Engineering Company, Florham Park, N.J.

[21] Appl. No.: 237,360

[22] Filed: Aug. 29, 1988

[51] Int. Cl.$^5$ .............................................. B24D 3/00
[52] U.S. Cl. .................................... 51/293; 51/309
[58] Field of Search ................................. 51/293, 309

[56] References Cited

U.S. PATENT DOCUMENTS

| | | | |
|---|---|---|---|
| 3,745,623 | 7/1973 | Wentroy, Jr. | 51/307 |
| 3,805,457 | 4/1974 | Shimizu | 51/293 |
| 4,534,773 | 8/1985 | Phaal et al. | 51/293 |
| 4,604,106 | 8/1986 | Hall et al. | 51/293 |
| 4,750,914 | 6/1988 | Chikaoka et al. | 51/293 |

*Primary Examiner*—A. Lionel Clingman
*Assistant Examiner*—Willie J. Thompson
*Attorney, Agent, or Firm*—S. Persley; Jay Simon

[57] ABSTRACT

A method for consolidating finely divided diamond particles to produce a substantially fully dense article having improved resistance to wear and cracking. Diamond particles are heated to an elevated temperature for compacting to form the fully dense article. The article is then held at an elevated temperature and time sufficient to rearrange and substantially reduce the dislocations in the article resulting during compacting to achieve a substantially strain-free state in the article. The article is then cooled to room temperature after which it may be given an improved leaching treatment to achieve superior thermal stability.

14 Claims, No Drawings

METHOD FOR FABRICATING FRACTURE-RESISTANT DIAMOND AND DIAMOND COMPOSITE ARTICLES

BACKGROUND OF THE INVENTION

1. Field of the Invention

This invention relates to a method for the preparation of fully dense, consolidated diamond or diamond composite articles as for use in cutting and drilling applications. The invention involves heat treating the article to improve wear and fracture resistance.

2. Description of the Prior Art

The conventional synthesis of diamond grit or powder involves the conversion of a non-diamond carbon to diamond in the presence of a metal acting as a solvent-catalyst under conditions of high temperature and high pressure at which diamond is the thermodynamically stable form of carbon. Although various carbonaceous materials, such as charcoal, coal, coke and graphite may be used as the carbon source, typically graphite, and specifically spectrally pure graphite, is used almost exclusively for the commercial production of diamond grit or powder. It is also possible to use as the carbon source carbon-containing organic compounds, such as anthracene, fluorene, pyrene, sucrose, camphor and the like.

With the use of graphite as the carbon source in accordance with the preferred practice, the graphite may be a powder, a disc of compressed and machined powder or a capsule into which the graphite is placed with the solvent-catalyst. Typically, the graphite charge in one of the above forms is converted to diamond in the presence of one or more metals or metal-containing compounds serving as the solvent-catalyst. Graphite can be converted directly to diamond in the absence of a catalyst but pressures of about 130 kbar and temperatures in the range of 3000 to 4000° C. are required. With the addition of conventional solvent-catalysts lower pressures and temperatures may be used in the range of 1200 to 1600° C. and 50 to 80 kbar, respectively. The solvent catalyst dissolves the graphite until a saturated solution of carbon relative to graphite is obtained. The catalytic effect is the promotion of the structural rearrangement of the graphite to diamond. Significant solvent-catalysts are the Group VIII transition metals, including platinum, chromium, tantalum, manganese and alloys containing at least one of these metals. Iron, nickel, cobalt and manganese are the preferred pure metal solvent-catalysts and iron-manganese, nickel-chromium, nickel-manganese, iron-nickel, nickel-cobalt and various other nickel-containing alloys are generally the preferred alloys for this purpose. The solvent-catalyst is employed either in powder form, which may be loose or compacted, or in the form of a disc.

Other additives, such as boron, are sometimes used as additions to the charge to be compacted in order to change one or more of the properties of the resultant diamond consolidated article. The solvent-catalyst to carbon volume ratios are typically 0.1 to 10 with a preferred ratio of 0.5 to 2. Consolidation is achieved typically by the use of belt presses or cubic presses. The constituents are loaded into a cell of cylindrical configuration. Heating is usually provided by passing an electric current directly through the charge within the cell. The graphite-to-diamond conversion is performed in the diamond stable region of temperatures and pressures in the range of 1200 to 2500° C. and 50 to 120 kbar, respectively. The reaction time is usually within the range of 0.5 to 20 minutes.

Broadly, the consolidation sequence includes pressurization, heating to desired maximum reaction temperature, reaction time to permit conversion, cooling down and pressure release.

After cooling of the consolidated charge or mass, the diamond crystals are separated from the metal matrix by acid dissolution. For this purpose, nitric acid may be used at a temperature of 100 to 300° C., which dissolves all of the constituents except the diamonds. The diamonds may then be separated from the liquid by centrifuge or filtration. If, after this dissolution step, the diamonds are agglomerated, they may be separated by a light-crushing operation. The separated diamonds may then be sorted according to size and shape. The size of the resulting diamond grit or powder may vary within the range of 1 micron up to about 1 mm.

Diamond particles so produced may be compacted into a substantially fully dense consolidated article, such as drill blanks for use in producing drill bits. For this purpose, the charge may be compacted to produce a monolithic structure or may be compacted onto a disc or substrate of for example tungsten carbide and cobalt. The resulting disc of the substrate with a diamond layer thereon may be assembled in various configurations depending upon the cutting or drilling device with which it is assembled. In any event, consolidation is achieved by sintering the diamond powder at high temperatures and high pressures in the diamond stable region in the presence of a catalyst or a non-catalytic sintering aid to obtain a strong, interbonded, polycrystalline consolidated mass or article of substantially full density. The apparatus used for compacting may be the same as that used in the synthesis of the diamond particles. Cell assemblies typically used in these applications are described in U.S. Pat. No. 3,407,455 and U.S. Pat. No. 4,604,106.

According to prior-art compacting or consolidating practice, including the U.S. patents listed hereafter, the preferred charge is diamond powder although graphite powder may be mixed therewith. In this application, the diamond powder generally constitutes at least 70 volume % of the total mass, preferably 90 to 99%. The final compacted article has diamond grains of 10 to 20 microns but depending upon the temperature may have a large-grain structure of about 100 microns.

Prior to charging of the diamond powder to the cell, the diamond powder may be cleaned by heating it in the presence of hydrogen gas typically for one hour at a temperature within the range of 800 to 1000° C. Boron may be employed as a sintering aid for the diamond powder and is typically introduced by doping the diamond powder prior to introducing the diamond charge to the cell for compacting. Also, a pretreatment step involving surface graphitization of the diamond powder may be performed to provide thereon a uniform coating of graphite which promotes the penetration of the catalyst into the diamond layer within the cell by continuously dissolving the graphite to form diamond during high temperature compacting. The catalyst-carbide charge may consist of cobalt, nickel or iron catalyst powder mixed with tungsten carbide, titanium carbide or tantalum carbide powder.

The following table lists patents representative of conventional practices relating to consolidated diamond or diamond composite articles:

| U.S. Pat. No. | Issue Date | Summary |
| --- | --- | --- |
| U.S. Pat. No. 3,141,746 | 7/21/64 | Diamond compact abrasive by sintering a mixture of diamond powder (50+ vol %) with a catalytic metal powder (one or more of Fe, Ni, Co and Ti) in the diamond stable region. |
| U.S. Pat. No. 3,574,580 | 4/13/71 | A method of making interbonded diamond compacts by sintering clean diamond powder in the diamond stable region, optionally intermixed with up to 3 wt % B, Si, or Be powder as a sintering aid. |
| U.S. Pat. No. 3,745,623 | 7/17/73 | Relates to powder diamond compact blanks having a 70+ vol % interbonded diamond layer joined to a cemented carbide substrate and the method for making them. |
| U.S. Pat. No. 4,224,380 | 9/23/80 | A temperature-resistant, bleached powder diamond compact formed by the removal of the metallic catalyst phase from the interbonded diamond. |
| U.S. Pat. No. 4,288,248 | 9/8/81 | A method of making the temperature-resistant, leached powder diamond material and compacts of U.S. Pat. No. 4,224,380 by acid leaching. |
| U.S. Pat. No. 4,518,659 | 5/21/85 | An improved process for making powder diamond compacts using a first catalyst (copper) to sweep through the diamond charge preceding a Co catalyst. |
| U.S. Pat. No. 4,592,433 | 6/3/86 | A powder diamond compact blank of diamond strips in a grooved cemented carbide substrate. |

As described in U.S. Pat. No. 3,745,623, the cell assembly for consolidation may include a salt spacer, a zirconium disc separator, a tungsten carbide/cobalt disc, a diamond powder layer and an additional zirconium disc separator. The loading sequence involves the stacking of several single charges of this construction in a zirconium or tantalum metal sheath or capsule which is placed in the cell after the capsule is full.

The steps involved in consolidation are similar to the processing for synthesis of the diamond powder. Namely, the process includes pressurization from 0.001 to 50 kbar or greater and heating up to sintering temperature from 20 to 1500° C. or greater. Sintering may be effected at a pressure of 50 kbar and a temperature of 1500° C. for 10 minutes. Cooling down is then effected from a temperature of 1500° C. to a temperature of 20° C. or less with pressure release from 50 to less than 0.001 kbar. Sintering is generally conducted within the temperature range of 1200 to 1600° C. and the pressure range of 40 to 70 kbar. Sintering times are generally within the range of 10 to 15 minutes, particularly when a belt press is employed, with sintering times less than 3 minutes being possible with the use of a cubic press.

After consolidation, the stack of sintered, consolidated blanks is separated manually and the zirconium capsule is removed. Lapping and polishing operations are employed to remove any particles of material adhering to the edges and flat surfaces of the blanks. The blanks are then ground to shape, which is typically cylindrical, and to the dimensions required for the particular cutting or drilling assembly with which they are to be used. Sizes conventionally employed for this purpose are diameters of about 1 to 5.5 cm with thicknesses of 3.5 to 8 mm, which includes a 0.7 mm to 1 mm thick diamond layer on the blank assembly. The resulting product is a disc of two layer structure, specifically a substrate of a composition, such as tungsten carbide and cobalt, with a fully dense layer of diamond particles bonded thereto.

Further post-consolidation acid leaching treatments involving nitric and hydrochloric acid have also been used for fabricating temperature-resistant powder diamond material and compacts, from which most of the interpenetrating network of Co has been removed. This prior art is described in U.S. Pat. No. 4,224,380 and U.S. Pat. No. 4,288,248.

For specific applications such as the production of drill bits used in oil well drilling applications, the disc is mounted on a cutter by the use of a brazing step. Specifically, the blank is brazed onto a tungsten carbide/cobalt post. A plurality of these post-disc assemblies are then mounted on drill bits of various configurations with the diamond portion of each acting as a cutting surface. Multiple cutters of leached powder diamond material may also be brazed into the surface of matrix-body drill bits, replacing either some or all of natural diamond stones typically used in such bits. Drill bits of these types constructions are well known in the art.

During use of the above-described consolidated diamond articles for cutting and drilling applications, it is advantageous that these articles be characterized by high wear resistance and resistance to cracking. Applicants have determined, in this regard, that during the high-temperature compacting operation to achieve the fully dense, consolidated diamond article, dislocations in the diamond crystal structure result. Dislocations in crystalline materials, such as diamond, are linear regions of lattice imperfection. These imperfections allow the crystal to undergo plastic deformation at sufficiently high temperatures and are also generated by the deformation process. Since these imperfections consist of regions of lattice distortion, they generate highly localized stress fields. As such, they provide sites for crack initiation and propagation when the diamond article is under high applied stress characteristic of use thereof in cutting and drilling applications. Likewise, these dislocations in the diamond crystal structure adversely affect the wear resistance of the consolidated diamond article during use thereof in cutting or drilling applications by providing sites for fracture or chipping away of the article at regions of stress difference caused by these dislocations. Applicants have determined, therefore, that these dislocations resulting during the high temperature compacting of diamond particles to form a consolidated article therefrom adversely affect the performance of the article from the standpoints of both cracking, which in severe instances may result in catastrophic failure, and wear resistance.

SUMMARY OF THE INVENTION

It is accordingly a primary object of the present invention to provide a method for fabricating a substantially fully dense diamond or diamond composite article, wherein the production of dislocations in the crystal structure adversely affecting resistance to cracking and promoting wear is diminished.

A more specific object of the invention is to provide a method for consolidating diamond particles wherein a heat-treating step is employed to rearrange and remove dislocations in the crystal structure to achieve therein substantially strain-free diamond grains.

An additional object of the invention is to provide a heating step in the compacting of diamond powders to produce a substantially strain-free state or recovered state in the microstructure of the consolidated article, and in addition provide for control of the perfection of the crystal structure thereof.

Yet a further object of the invention is to provide an improved leaching step for extracting substantially all the cobalt from the strain-free compact, thereby further improving its thermal stability.

Additional objects and advantages of the present invention will be set forth in part in the description that follows and in part will be apparent from the description or may be learned by the practice of the invention. The objects and advantages of the invention may be realized and obtained by the method particularly pointed out in the appended claims.

In accordance with the method of the invention, consolidation of finely divided diamond particles is achieved to produce a substantially fully dense article. The method comprises heating charge including finely divided diamond particles to an elevated, compacting temperature and in compacting the charge, while at this elevated temperature, to form the desired substantially fully dense article therefrom. Thereafter, in accordance with the invention, the article is held at an elevated temperature and time sufficient to rearrange and remove substantially all the dislocations in the article resulting during the aforementioned compacting. This achieves, in the article, a substantially strain-free state. The article is finally cooled to room temperature.

Further, in accordance with the invention, the step of holding the article at elevated temperature may comprise maintaining the article at an elevated temperature after compacting and prior to cooling to room temperature from the elevated compacting temperature. The elevated temperature at which the article is maintained may be lower than the compacting temperature but still sufficient to rearrange and remove said dislocations. Alternately, in accordance with the invention, the step of holding the article at elevated temperature may comprise cooling the article from the elevated compacting temperature and then reheating the article to said sufficient elevated temperature for a time sufficient to rearrange and substantially remove any dislocations in the article resulting during compacting to achieve a substantially strain-free state in the article. The reheating may be to an elevated temperature sufficient to achieve diamond crystal growth or may be below the diamond crystal growth temperature.

Further, in accordance with the invention, prior to cooling the article to room temperature, the article may be heated to a higher temperature and cooled from this higher temperature at a controlled cooling rate sufficient to rearrange and substantially remove any dislocations in the article resulting during compacting to achieve a substantially strain-free state. This heating step may be at a temperature sufficient to achieve diamond crystal growth or at a temperature at which substantial diamond crystal growth does not result. As an alternate practice in accordance with the invention, acid leaching may be performed on the article after compacting to remove therefrom any metal employed during synthesis of the article. The leachant may be nitric acid, a combination of nitric acid and hydrochloric acid, or hydrogen peroxide. The metal employed during synthesis of the article may be iron, cobalt or nickel.

The holding of the diamond compact at elevated temperature for purposes of rearranging and removing a substantial portion of the dislocations therein to achieve a substantially strain-free state in accordance with the practice of the invention may be at an elevated temperature within the range of 1200 to 2000° C. for 13 to 125 minutes.

Typically, in accordance with the practice of the invention, the finely divided diamond particles used for producing the consolidated article are within the particle size range of 1 to 200 microns.

DETAILED DESCRIPTION OF THE PREFERRED EMBODIMENTS

Reference will now be made in detail to presently preferred embodiments of the invention, examples of which are described below.

In the experimental work resulting in the invention, applicants have examined conventional diamond particle consolidated articles subjected to wear incident to typical cutting and drilling applications. The wear and fracture characteristics of the particles examined indicate that wear thereof results from chipping away at dislocations and that these dislocations also provide sites for crack propagation under applied working stress which may result in catastrophic failure of the articles. By heat treating the articles in accordance with applicants' invention, applicants have provided for rearranging and removing these dislocations to achieve a substantially strain-free state in the article. In this manner, both wear resistance and resistance to cracking is improved. The following constitutes typical examples of the practice of the invention.

EXAMPLE 1

A diamond particle charge produced in accordance with the aforementioned conventional practice is placed atop a tungsten carbide-cobalt substrate, with a salt and zirconium spacer, within a zirconium tube, which is then sealed with zirconium discs on both ends. This capsule structure is in accordance with the structure and practice described in U.S. Pat. Nos. 3,745,623 and 4,604,106.

The capsule is heated to a temperature of 1550° C. during which time pressure is applied by the use of a belt press constructed and operated in accordance with the disclosure in U.S. Pat. No. 3,407,455. The sample is maintained for 10 minutes at a temperature and pressure of 1550° C. and 60k Bar, respectively, to achieve a substantially fully dense article. Thereafter, the article is held at a temperature of 1550° C. for 60 minutes prior to cooling to room temperature. This heating step results in rearranging and removing a substantial portion of the dislocations in the article resulting during the high temperature compacting to achieve therein a substantially strain-free state.

EXAMPLE 2

The practice of Example 1 is repeated except that the article is heated to a higher temperature after consolidation, which temperature is 1700° C., and control cooled from this temperature over a period of about 15 minutes to room temperature, whereby rearranging and removing of dislocations in the article resulting during compacting is obtained to achieve a substantially strain-free state.

EXAMPLE 3

The cycle of Example 1 is repeated except that after compacting, the article is cooled from the compacting temperature to 1300° C. and then reheated to an elevated temperature of 1700° C. for 45 minutes to substantially reduce the number of dislocations in the article resulting during compacting to achieve a substantially strain-free state.

EXAMPLE 4

Improved acid leaching of the compacts produced in accordance with the foregoing examples was performed using the following practices, which result in a cobalt-free leached diamond composite free of cobalt impurity, thereby resulting in better temperature resistance of the leached compact.

The diamond compact layer was first removed from the tungsten carbide-cobalt substrate by electric discharge machining. The resulting diamond composite disc was then leached with acid reagents in a glass beaker under the influence of heat and ultrasonic agitation as described below. EDS analysis of the leached composite in a SEM indicated that all intra-granular cobalt had been removed. Two procedures were demonstrated to be effective, each carried out at or close to the boiling point, 200° F. or higher, for about 72 hours.

In the first procedure, a combination of HCl and $H_2O$ (hydrochloric acid and water) in 50%-50% by volume was made, into which combination $H_2O_2$ (hydrogen peroxide) was added in 95%-5% by volume. This mixture reacted vigorously with the diamond compact. As the reaction subsided, more $H_2O_2$ was added and further treatment continued until the vigorous reaction no longer occurred. At that time the reagent was spent, and the aforementioned steps were repeated until the leaching was completed.

In the second procedure, a combination of HCl and $HNO_3$ (hydrochloric and nitric acids) was made in 75%-25%, respectively, by volume and heated to boiling, in contact with the diamond composite. Vigorous reaction took place with the development of a strong amber color in the solution and the evolution of dense brown fumes. When the reaction began to subside, the spent reagent was discarded and new reagent generated per the sequence described.

As may be seen from the above specific example of the practice of the invention, by the introduction of a heat-treating step to the conventional processing sequence for consolidating finely divided diamond particles, it is possible to rearrange and substantially reduce the number of dislocations in the article that have resulted during compacting to achieve a substantially strain-free state in the article. In this manner, these dislocations do not act as sites for crack nucleation. Consequently, crack propagation that may result in catastropic failure of the article under conditions of applied stress resulting during the use thereof in typical cutting and drilling applications is avoided. It may be seen, therefore, that the inventive practices for fabricating dense, consolidated articles of diamond and diamond composites provide an improvement with respect to conventional practices for consolidating such articles, wherein both improved resistance to cracking and improved wear resistance are achieved. It may further be seen that the inventive practices for leaching the improved compacts impart additional advantages of improved thermal stability, as well as superior fracture resistance.

What is claimed is:

1. A method for consolidating finely divided diamond particles to produce a substantially fully dense article, said method comprising heating a charge including finely divided diamond particles to an elevated compacting temperature, compacting said charge while at said elevated compacting temperature to form said substantially fully dense article, thereafter holding said article at an elevated temperature and time sufficient to rearrange and substantially remove dislocations in said article resulting during said compacting to achieve a substantially strain-free state therein and cooling said article to room temperature.

2. The method of claim 1 wherein said holding of said article at elevated temperature comprises maintaining said article at an elevated temperature after compacting and prior to cooling to room temperature from said elevated compacting temperature.

3. The method of claim 1 wherein said holding of said article at elevated temperature comprises maintaining said article at an elevated temperature which is lower than the compacting temperature, prior to cooling to room temperature from said compacting temperature.

4. The method of claim 1 wherein said holding of said article at elevated temperature after compacting comprises cooling said article from said elevated compacting temperature and then reheating said article to said elevated temperature and said time sufficient to rearrange and substantially remove any dislocations in said article resulting during said compacting to achieve a substantially strain-free state therein.

5. The method of claim 4 wherein said reheating is to an elevated temperature sufficient to achieve diamond crystal growth.

6. The method of claim 4 wherein said reheating is to an elevated temperature below diamond crystal growth temperature.

7. The method of claim 1 wherein after said compacting and prior to said cooling of said article to room temperature, said article is heated to a higher temperature and cooled from said higher temperature at a controlled cooling rate sufficient to rearrange and remove any dislocations in said article resulting during said compacting to achieve a substantially strain-free state therein.

8. The method of claim 7 wherein said heating to a higher temperature achieves diamond crystal growth.

9. The method of claim 7 wherein said heating to a higher temperature does not result in substantial diamond crystal growth.

10. The method of claim 1, or 2, or 3, or 4, or 5, or 6, or 7, or 8, or 9 wherein acid leaching is performed on said article after compacting to remove therefrom any metal employed during synthesis of said article.

11. The method of claim 10 wherein said leaching is performed with a leachant selected from the group consisting of nitric acid, a combination of nitric acid and hydrochloric acid, and hydrogen peroxide.

12. The method of claim 11 wherein said metal is selected from the group consisting of iron, cobalt and nickel.

13. The method of claim 1 wherein said article is held at elevated temperature with the range of 1200 to 2000° C. for 13 to 125 minutes.

14. The method of claim 1 wherein said finely divided diamond particles are within the particle size range of 1 to 200 microns.

* * * * *